(12) United States Patent
Stümpert et al.

(10) Patent No.: US 7,106,701 B2
(45) Date of Patent: Sep. 12, 2006

(54) END-TO-END FRAME QUALITY CLASSIFICATION

(75) Inventors: Martin Stümpert, Hochspeyer (DE); Erik Colban, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 904 days.

(21) Appl. No.: 10/037,346

(22) Filed: Jan. 2, 2002

(65) Prior Publication Data

US 2002/0186663 A1 Dec. 12, 2002

Related U.S. Application Data

(60) Provisional application No. 60/259,699, filed on Jan. 5, 2001.

(51) Int. Cl.
*H04Q 7/20* (2006.01)

(52) U.S. Cl. .................... 370/252; 370/401

(58) Field of Classification Search .............. 370/252, 370/400, 401; 714/48, 57; 455/423
See application file for complete search history.

(56) References Cited

U.S. PATENT DOCUMENTS

| | | | |
|---|---|---|---|
| 6,108,560 A | | 8/2000 | Navaro et al. |
| 6,654,922 B1 * | | 11/2003 | Numminen et al. ......... 714/748 |
| 6,839,356 B1 * | | 1/2005 | Barany et al. .............. 370/401 |
| 6,907,005 B1 * | | 6/2005 | Dahlman et al. ........... 370/236 |
| 2002/0006114 A1 * | | 1/2002 | Bjelland et al. |
| 2002/0012321 A1 * | | 1/2002 | Rune et al. ................. 370/252 |
| 2002/0183053 A1 * | | 12/2002 | Gopalakrishna et al. .... 455/423 |
| 2004/0032846 A1 * | | 2/2004 | Rasanen et al. ............ 370/338 |

FOREIGN PATENT DOCUMENTS

| | | |
|---|---|---|
| WO | WO 0070885 A | 11/2000 |
| WO | WO 0139424 A | 5/2001 |
| WO | WO 0163898 A | 8/2001 |

OTHER PUBLICATIONS

"3rd Generation Partnership Project (3GPP); Technical Specification Group Radio Access Network; UTRAN Iu Interface User Pane Protocols", 3GPP TS 25.415 version 3.5.0. Release 1999.
"3rd Generation Partnership Project (3GPP); Technical Specification Group Radio Access Network; RRC Protocol Specification", 3GPP TS 25.331 version 3.5.0. Release 1999.

* cited by examiner

Primary Examiner—Min Jung

(57) ABSTRACT

Frame quality information is transmitted and updated within a core network (CN) and a RAN downlink to UE. In the CN, CRC checks are done and the FQC field is set according to the results of the CRC check and the received FQC field's value, and transferred to the next node in the communication path. A server, or servers, instruct(s) MGWs and RNCs within the communications path to apply CRC checks and generate the FQC field according to the received FQC field and the applied CRC check. The Iu framing protocol is used to transfer the FQC between the CN and RNC. A radio protocol, such as RRC protocol, is used between the RNC and the mobile to transport the FQC field in the downlink to the UE. Within the CN, the FQC field is transported over the Nb interface.

19 Claims, 7 Drawing Sheets

END-TO-END FRAME QUALITY CLASSIFICATION

CROSS-REFERENCE TO RELATED APPLICATION

This application is related to, and claims priority from, U.S. Provisional Application No. 60/259,699 entitled "Frame Quality Classification End to End" filed on Jan. 5, 2001, the disclosure of which is incorporated herein by reference.

BACKGROUND

The present invention is related to communication in a telecommunication system, and more particularly to improving end-to-end communication in a modern telecommunication system.

Universal Mobile Telecommunication Systems (UMTS) provide a third generation (3G), broadband, packet-based network architecture. UMTS is endorsed by major standards bodies and manufacturers as the planned standard for mobile users around the world. The UMTS network transports text, digitized voice, digitized video, and multimedia at data rates up to and possibly higher than 2 Mbps. Once fully implemented, computer and phone users will be able to travel staying connected to the Internet with a consistent set of capabilities. Access is obtained through a combination of terrestrial wireless and satellite transmissions.

FIG. 1 illustrates a portion of a UMTS network. The network includes a core network part (CN) 1, which may be a network handling voice calls using UMTS Mobile-Services Switching Centers (UMSCs) 2 or may be a data network such as a General Packet Radio Service (GPRS) network including Serving GPRS Support Nodes (SGSNs) 2. The CN 1 may also include one or more Media Gateways (MGW) (not shown) to control data flow within the CN 1 and between the CN 1 and other networks. A subscriber or User Equipment (UE) 3 is coupled to the CN 1 via an access network 4 referred to as a Universal Terrestrial Radio Access Network (UTRAN). More particularly, the UMSCs/SGSNs 2 are connected to Radio Network Controllers (RNCs) 5,6 of the UTRAN 4 over an interface referred to as the Iu interface.

Each RNC 5, 6 forms part of a Radio Network Subsystem (RNSs) 7,8 which also comprises a set of Base Transceiver Stations (BTS) 9 referred to in UMTS terminology as Node B's. The interface between a RNC 5,6 and a Node B 9 is known as the Iub interface. A Node B 9 provides the connection point for a UE 3 to the UTRAN 4, with the interface between the Node B 9 and the UE 3 known as the Uu interface. The interface between two RNCs 5,6 is known as the Iur interface. The RNS (RNS 7 in FIG. 1) which connects a UE 3 to the CN 1 at any given time is referred to as the Serving RNS (SRNS) for that particular UE 3. Two UEs 3, 10 may also communicate with each other via respective RNCs through the CN 1 involving one or more MGWs. The interface used to convey data between consecutive MGWs in the CN 1 is the Nb interface.

FIG. 2 illustrates in general terms the bearer structure used by a UTRAN to carry user data between the UE 3 and the CN 1. When it is required to establish a user plane (UP) connection, the responsible UMSC or SGSN 2 instructs the UTRAN 4 to establish a logical connection between the UMSC or SGSN 2 and the UE 3. This logical connection is referred to as a Radio Access Bearer (RAB). The established RAB inherits the requirements of the requested UMTS service, e.g., Quality of Service, etc. Based on the inherited requirements of the RAB, the RNC 5,6 establishes UP connections with the CN 1 (i.e., UMSC or SGSN 2) and with the UE 3. The connection between the RNC 5,6 and the CN 1 is referred to as the Iu bearer, while the connection between the RNC 5,6 and the UE 3 is referred to as the Radio Bearer (RB). Both of these bearers represent further logical channels, with the RNC performing a mapping between them. The bearers themselves are mapped onto appropriate traffic channels for transmission over the respective interfaces (Nb, Iu, Iub, and Uu). A Radio Resource Control (RRC) protocol specifies the UE 3 to UTRAN 4 radio interface.

In addition to carrying user data, the Iu bearer carries related control information between the UTRAN 4 and the CN 1. Work is currently ongoing under the auspices of the 3GPP to specify the Iu UP protocol for carrying this control information.

As of the filing date of the above-identified priority application, the current 3GPP specification was R99. Accordingly, in this document, reference is made to the then published Iu UP specification TS 25.415 version 3.5.0 and RRC specification TS 25.331, version 3.5.0 (the first Nb UP specification was published after the priority date). Currently, the Iu UP specification is TS 25.415 (v4.2, 2001-9), the Nb UP specification is TS 29.415 (v4.1, 2001-9), and the RRC specification is TS 25.331 (v4.1, 2001-3).

Referring to FIG. 3, a functional model of the Iu UP protocol layer in Support Mode is illustrated. The Iu UP protocol layer in Support Mode includes three sets of functions: frame handler functions; procedure control functions; and non access stratum (NAS) data streams specific functions. The frame handler function is responsible for framing and de-framing the different parts of an Iu UP protocol frame. This function takes the different parts of the Iu UP protocol frame and sets the control part field to the correct values, including the handling of the frame number. It also ensures that the frame control part is semantically correct. This function is responsible for interacting with the Transport layers. This function is also responsible for the CRC (cyclic redundancy checking) check of the Iu UP frame header. The Iu UP frame with header CRC check error is discarded.

The NAS Data Streams specific function(s) are responsible for a "limited manipulation" of the payload and the consistency check of the frame number. If a frame loss is detected due to a gap in the sequence of the received frame numbers, it is reported to the procedure control function. These functions are responsible for the CRC check and frame quality classification handling as described below. The functions interact with the upper layers by exchanging Iu data stream blocks of Iu UP frame payload and provide service access to the upper layers for the procedure control functions.

On the Iu UP in Support Mode the frames are classified with the Frame Quality Classifier (FQC). This classifying is based on the radio frame classification and the setting of the RAB attribute 'Delivery of erroneous SDUs'. The RAB attribute 'Delivery of erroneous SDUs' indicates whether erroneous frames should be delivered or not. If it is set to YES then the UP entity implements, error checking and sets FQC bits (FQC field) accordingly; bad frames are delivered to the UP layer. If it is set to NO then the UP entity performs error checking and if a bad frame is detected then it is discarded. These settings are required only when the payload is to be examined by upper layer services. If it is set to NA then no checking is performed. See 3GPP TS 29.232, version 0.3.0 (current version 4.0.0), Media Gateway Controller—Media Gateway Interface.

FIG. 4 illustrates the main input and output information for the frame quality classification function on the Iu UP. The FQC information in the uplink path is handled by a serving RNC (SRNC) in the UTRAN 400. In the SRNC on the sending side, the Support Mode functions 420 receive the radio frame quality information as input together with the frame. Based on this information, the FQC is set for the frame, a CRC is or is not added (depending on the protocol data unit type) and the frame is sent to the CN.

Tables 1–3 below outline how the FQC is defined by R99. Table 1 below outlines the SRNC behavior on the uplink path for each associated FQC field setting and 'Delivery of erroneous SDUs (service data units)' RAB attribute:

Table 1: FQC Handling in the RNC on Uplink (lu interface)

| INPUT (for each subflow) | | ACTION (on lu UP frame) |
|---|---|---|
| Delivery of erroneous SDUs | Radio Frame Classification | Action taken in SRNC on the sending side |
| Yes | Bad | Set FQC to 'bad radio' |
| No | Bad | Frame not sent |
| no-error-detection-consideration | Any value | Set FQC to 'good' |
| Any value | Good | Set FQC to 'good' |

Referring to Table 1, if there is at least one subflow with the 'Delivery of erroneous SDUs' set to "No" and for at least one of those subflows the radio frame classification is "Bad" then the lu UP frame is not sent. If there is at least one subflow with the 'Delivery of erroneous SDUs' set to "Yes" and for at least one of those subflows the radio frame classification is "Bad" then the lu UP frame is sent with FQC set to "Frame bad due to radio." Otherwise the lu UP frame is sent with FQC set to "frame good". This is because only one FQC is sent for all RBs mapping into one lu, Nb bearer.

The Support Mode Functions 430 in the CN 410 on the receiving side performs a CRC check of the frame payload, if the CRC is present, and passes the appropriate frame and the appropriate frame quality classification information through the radio network layer service access point (RNL-SAP). Tables 2a and 2b below outline the CN behavior on the downlink and uplink path, respectively, for each associated CRC check result and 'Delivery of erroneous SDUs' RAB attribute scenario for the received frames:

TABLE 2a

FQC Handling in the CN/RNC on Downlink (lu)

| INPUT (for each subflow) | | ACTION |
|---|---|---|
| Delivery of erroneous SDUs (for each subflow) | Payload CRC check result (on lu UP frame) | (on lu UP frame) Actions taken at CN on the receiving side |
| Yes (at least one of the subflows have this value but none have 'No') | Not OK | Frame forwarded with FQC set to 'bad' |
| No (at least one of the subflows have this value) | Not OK | Drop frame, send lu-UP-Status primitive indicating 'no data' at the RNL-SAP, if CN |
| no-error-detection-consideration (all subflows have this value) | Any result | Frame forwarded with FQC as set |

TABLE 2b

FQC Handling in the CN on received Uplink (lu)

| INPUT (for each subflow) | | ACTION |
|---|---|---|
| Delivery of erroneous SDUs (for each subflow) | Payload CRC check result (on lu UP frame) | (on lu UP frame) Actions taken at CN on the receiving side |
| Yes (at least one of the subflows have this value but none have 'No') | Not OK | Frame forwarded with FQC set to 'bad' |
| No (at least one of the subflows have this value) | Not OK | Drop frame, send lu-UP-Status primitive indicating 'no data' at the RNL-SAP |
| no-error-detection-consideration (all subflows have this value) | Any result | Frame forwarded with FQC as set by UTRAN |
| Any value | OK | Frame forwarded with FQC as set by UTRAN |

Referring to Tables 2a and 2b, if a CRC is available and the CRC check indicates that the Iu UP is "Bad" and at least one subflow has the 'Delivery of erroneous SDUs' set to "No", then the Iu UP frame is dropped. If a CRC is available and the CRC check indicates that the Iu UP frame is "Bad" and at least one subflow has the 'Delivery of erroneous SDUs' set to "Yes", then the Iu UP frames are forwarded with the FQC set to "Bad." Otherwise, the Iu UP frame is forwarded with the FQC as received.

The Support Mode Functions 430 in the CN 410 on the sending side adds a CRC, if necessary to the frame payload and passes it together with the FQC. If the payload stems from a transcoding unit of the NAS within the CN 410 the FQC is always set to good.

The Support Mode Functions 420 in the SRNC of the UTRAN 400 then perform a CRC-check, if the CRC is present. Based on the CRC check, a decision is made whether to deliver the frame or not, as outlined in Table 3 below:

TABLE 3

Conventional FQC Handling in the RNC on Downlink

| INPUT | | | ACTION |
|---|---|---|---|
| 'Delivery of erroneous SDUs' (for each subflow) | FQC | CRC check (if payload CRC present) (on Iu UP frame) | (on Iu UP frame) Actions taken at SRNC on the receiving side |
| Yes | 'good' | Not OK | Drop frame |
| No | 'good' | Not OK | Drop frame |
| no-error-detection-consideration | 'good' | Any result | Pass the frame to radio interface protocols |
| Any value | 'good' | OK | Pass the frame to radio interface protocols |
| Any value | 'bad' or 'bad radio' | Any result | Drop frame |

Referring to Table 3, if a CRC is available and the CRC check indicates that the Iu UP is "Bad" then the frame is dropped, regardless of the 'Delivery of erroneous SDUs' RAB attribute indication. Otherwise, the frames are passed to radio interface protocols. The FQC field is not forwarded to the UE. When the received FQC is set to 'bad' or 'bad radio', the frame is dropped.

Cellular networks depend heavily on codecs to compress speech in order to efficiently utilize the expensive bandwidth resources both in the radio interface and in the transmission networks. Unnecessary transcoding of speech significantly degrades quality and, therefore, cellular systems try to avoid it for mobile-to-mobile calls when both UEs and the network support a common codec type. A transcoder functions to change the encoding of information from one particular encoding scheme to another, most commonly to/from a compressed speech algorithm from/to pulse code modulation (PCM).

The 3GPP standardization includes Transcoder Free Operation (TrFO), which allows the configuration of speech or multimedia calls without a transcoder device being physically present in the communication path and hence no control, conversion, or other functions are associated with the call. For TrFO calls, the compressed speech is carried end to end (RNC to RNC or between RNC and another compressed voice terminal).

The Nb UP operates in the UP of the CN and is used to convey data between MGWs. The Nb UP protocol is initiated at one MGW and acknowledged by an adjoining MGW. The Nb framing protocol is inherited from the Iu framing protocol. The Support Mode is used for compressed voice.

In TrFO, a transcoder is no longer located where the Iu interface terminates. However, without a transcoder the FQC function will not work correctly. Faults can occur inside the CN and the quality of TrFO calls will drop drastically when the quality of the transmission over the air interface decreases. Currently, FQCs are neither transported within the CN nor to the UE via the downlink path. A mechanism is needed to provide for the handling of CRC and FQC information on the network level for all applications, data or multimedia, that rely on these functions, thereby improving quality end-to-end.

SUMMARY

The present invention addresses these and other concerns. A mechanism for transporting and maintaining FQCs within the CN and to the UE via a downlink is provided.

In the CN, CRC checks are done and the FQC field is set according to the results of the CRC check and the received FQC field's value, and transferred to the next node in the communication path. The FQC bits are ultimately transferred to the speech codec, where they are needed, which may be in the CN or a UE.

A server, or servers, instruct(s) MGWs and RNCs within the communications path to apply CRC checks and generate the FQC field according to the received FQC field and the applied CRC check. A 'bad frame' indication is transferred in the FQC fields only under certain conditions, as described in detail in the tables below.

The FQC field indication is transferred through the CN to the transcoder or other application. The transcoder or other application can be in the CN or in the UE. The Iu framing protocol is used to transfer the FQC from the CN to the RNC and the radio protocol, such as RRC protocol, between the RNC and the UE is used to transport the FQC field in the downlink. Within the CN, the FQC field is transported over the Nb interface.

More than one FQC may be transmitted through the CN for a corresponding radio protocol frame. More particularly, individual subflow FQCs within the same user plane instance may be transmitted through the CN.

BRIEF DESCRIPTION OF THE DRAWINGS

The above and other objects, features, and advantages of the present invention will become more apparent in light of the following detailed description in conjunction with the drawings, in which like reference numerals identify similar or identical elements, and in which.

sets the FQC field 645 in the Iu frame sent uplink from the RNC 640 to a first MGW 650 of the CN via the Iu UP. This frame is then forwarded, via the Nb interface, through all MGWs 650–670 in the communication path without any further CRC checks being required, since the CRC result and the Iu frame may be transmitted through the CN unchanged.

A server associated with a second MSC 620, instructs a second RNC 680, serving the second UE 690 (the other party to the call), to perform CRC checking on downlink frames received from the CN (MGW 670) and sets the downlink FQC field 685 according to the FQC field received at the second RNC 680 from MGW 670 via the Iu UP and the results of the CRC check. The FQC is transmitted to the second UE 690 via a common radio interface protocol, such as RRC, between the second RNC 680 and UE 690 in the downlink path. Table 4 summarizes the FQC field handling in the RNC 680 on downlink according to an embodiment of the present invention.

TABLE 4

FQC Handling in RNC on Downlink.

| INPUT | | | |
|---|---|---|---|
| 'Delivery of erroneous SDUs' (for each subflow) | FQC | CRC check (if payload CRC present) (on Iu UP frame) | ACTION (on Iu UP frame) |
| 'yes' or 'no' | 'good' | OK | Pass the frame to radio interface protocols. Forward FQC unchanged. |
| 'yes' | 'bad radio' | OK | Leave FQC unchanged. Forward SDU and FQC to upper layer. |
| 'yes' | 'good' or 'bad radio' | Not OK | Set FQC to 'bad'. Pass the frame to radio interface protocols. |
| 'yes' | 'bad' | Any | Pass the frame to radio interface protocols. Forward FQC unchanged. |
| 'no' | 'good' | Not OK | Drop frame |
| 'no' | 'bad' or 'bad radio' | Any | Not applicable. SDUs are dropped at a previous link. |

Figure 8:
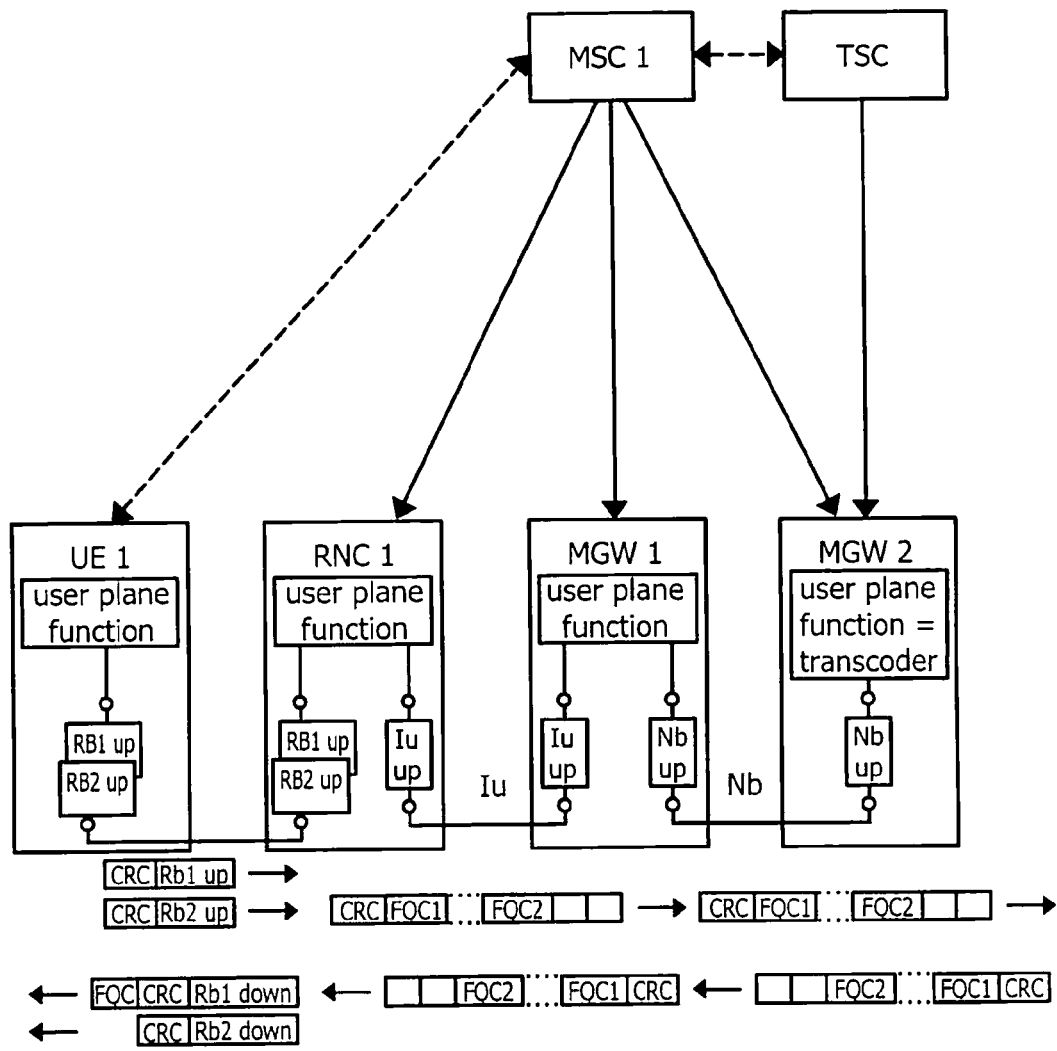

FIG. 8 illustrates a case where multiple individual subflows that correspond to the radio interface protocol frames forwarded to the serving RNO 640, 680 are transmitted through the ON according to another embodiment of the present invention.

DETAILED DESCRIPTION

Preferred embodiments of the present invention are described below with reference to the accompanying drawings. In the following description, well-known functions and/or constructions are not described in detail to avoid obscuring the invention in unnecessary detail.

Figure 1:
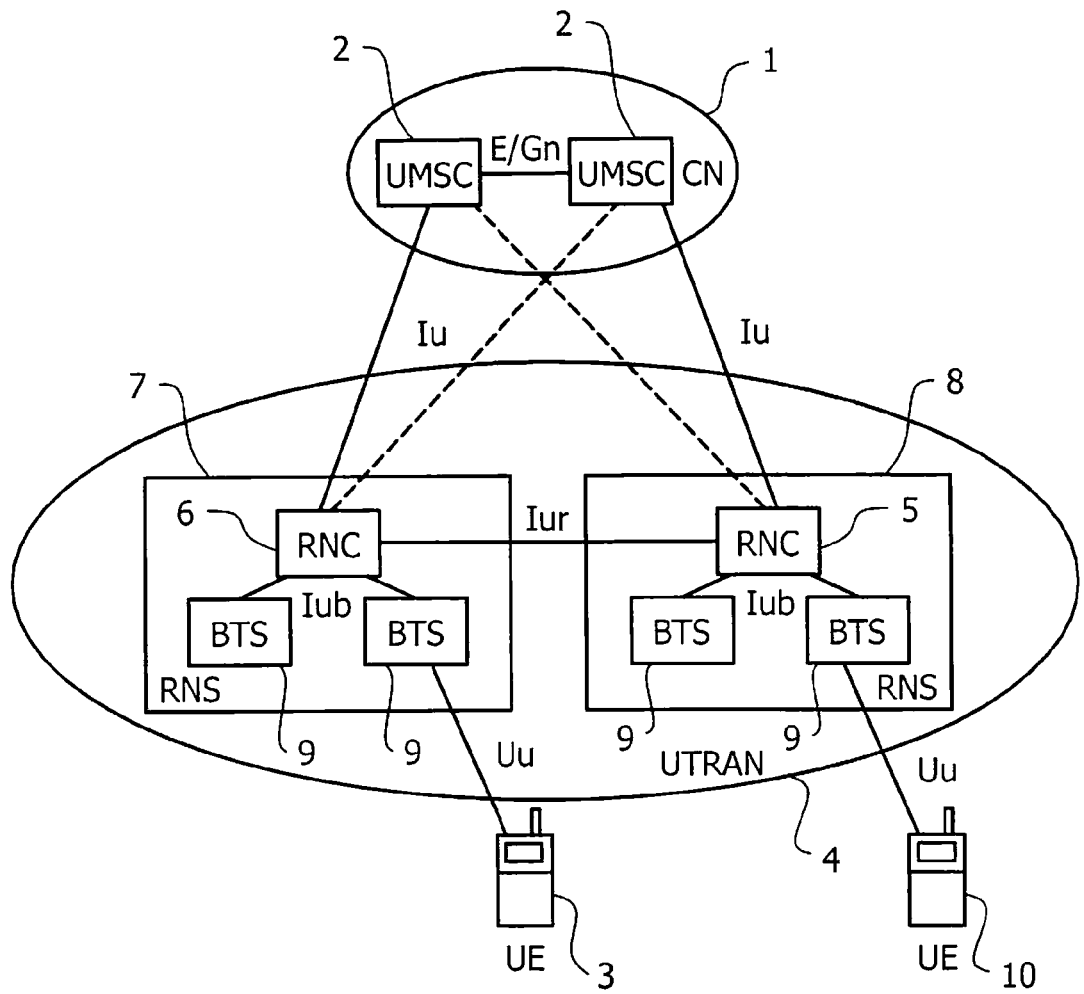
FIG. 1 illustrates a portion of a UMTS network.
Figure 2:
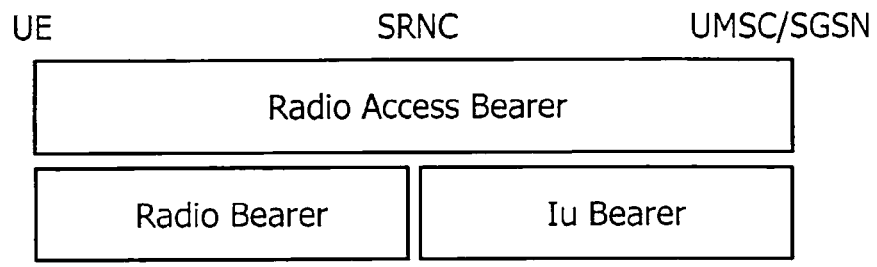
FIG. 2 illustrates the bearer structure used by a UTRAN to carry user data.
Figure 3:
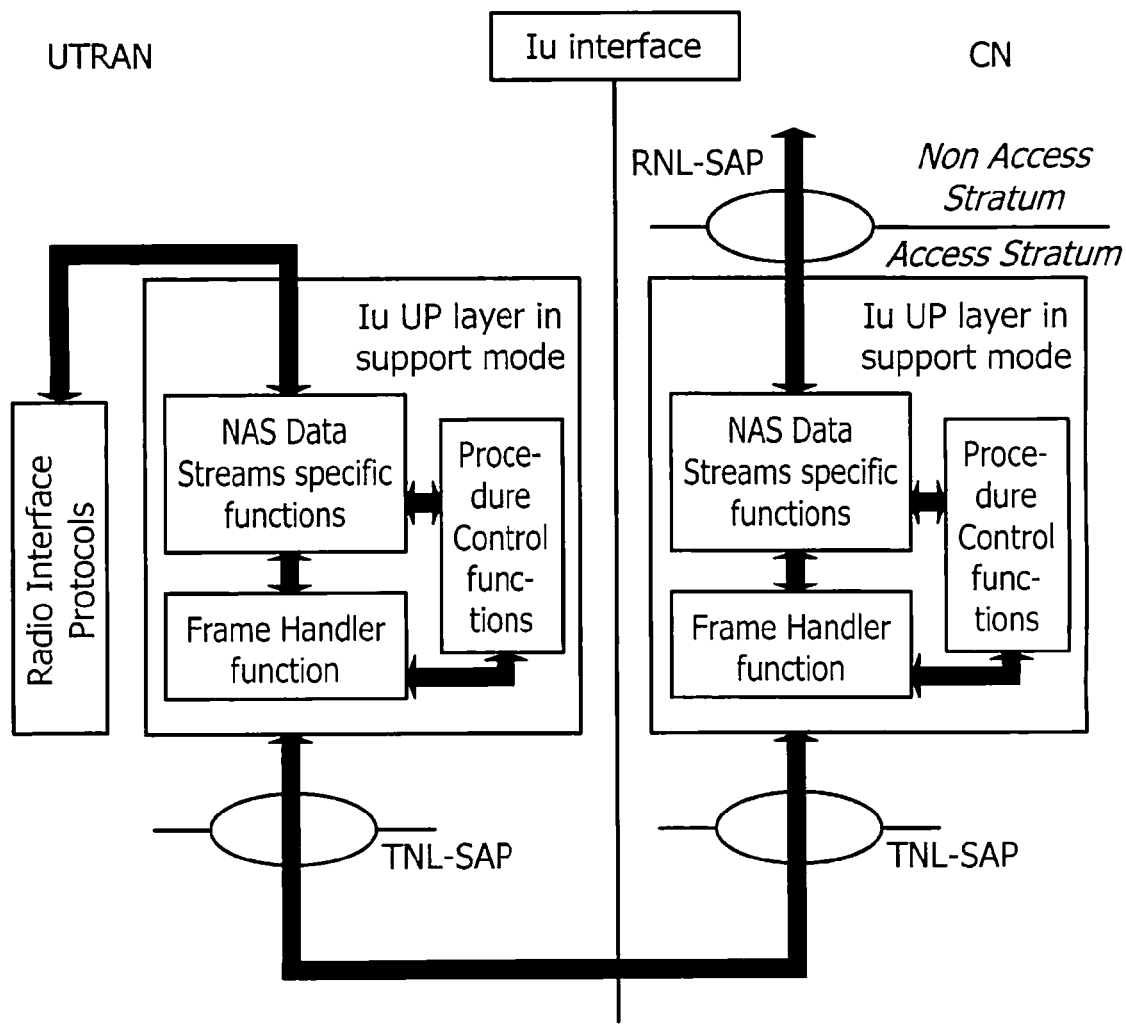
FIG. 3 illustrates a functional model of the Iu UP protocol layer in Support Mode.
Figure 4:
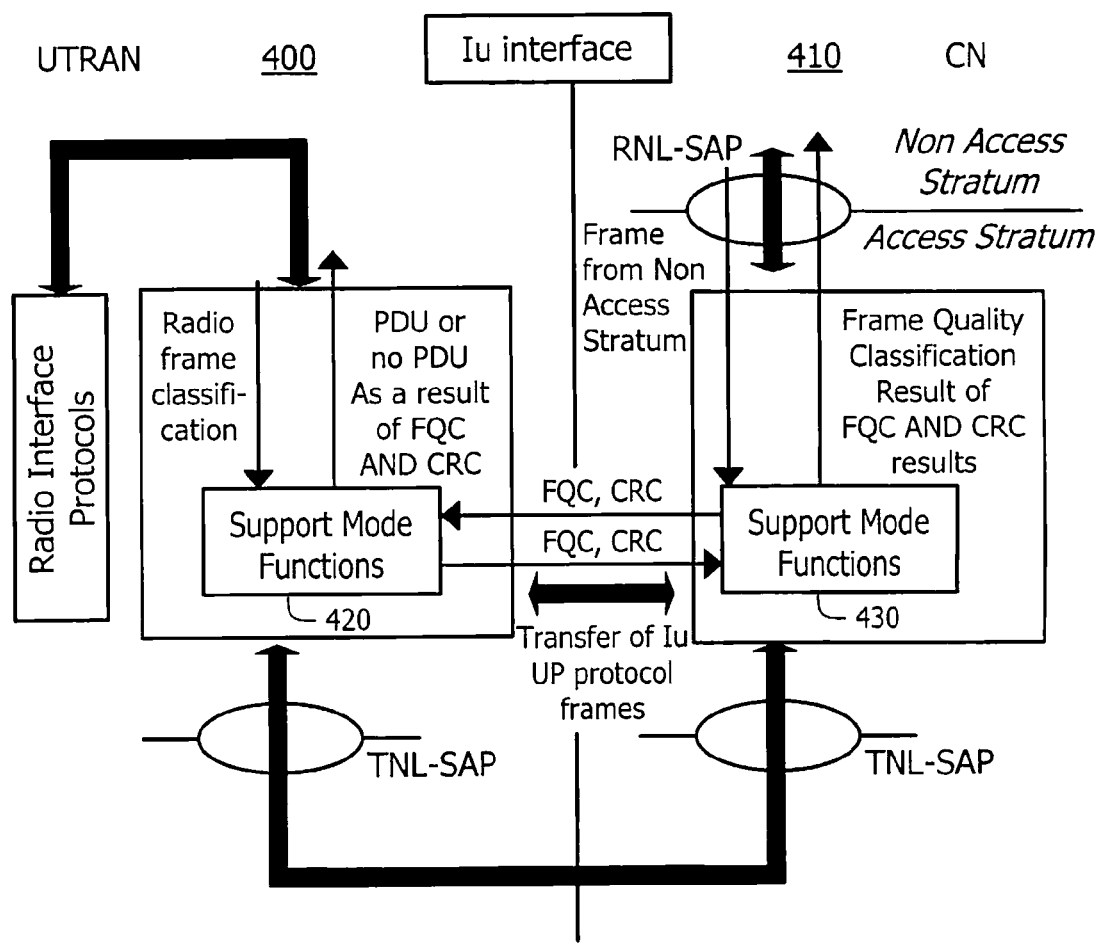
FIG. 4 illustrates the main input and output information for the frame quality classification function on the Iu UP.
Figure 5:
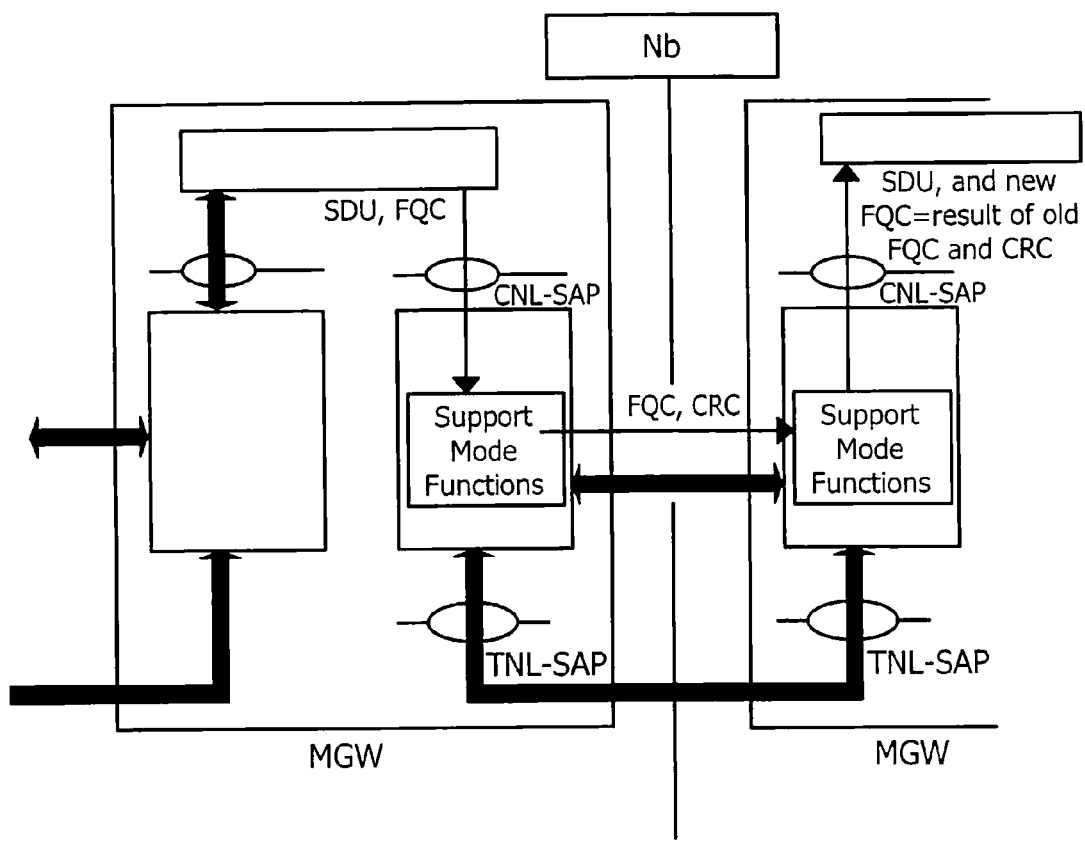
FIG. 5 illustrates the frame quality classification function on the Nb UP between two MGWs.

Turning again to the drawings, FIG. 5 illustrates the frame quality classification function on the Nb UP between two MGWs. On the Nb UP in Support Mode the frames are classified with the FQC. This classifying is based on the frame classification of the preceding link and the setting of the attribute 'Delivery of erroneous SDUs'.

Figure 6:
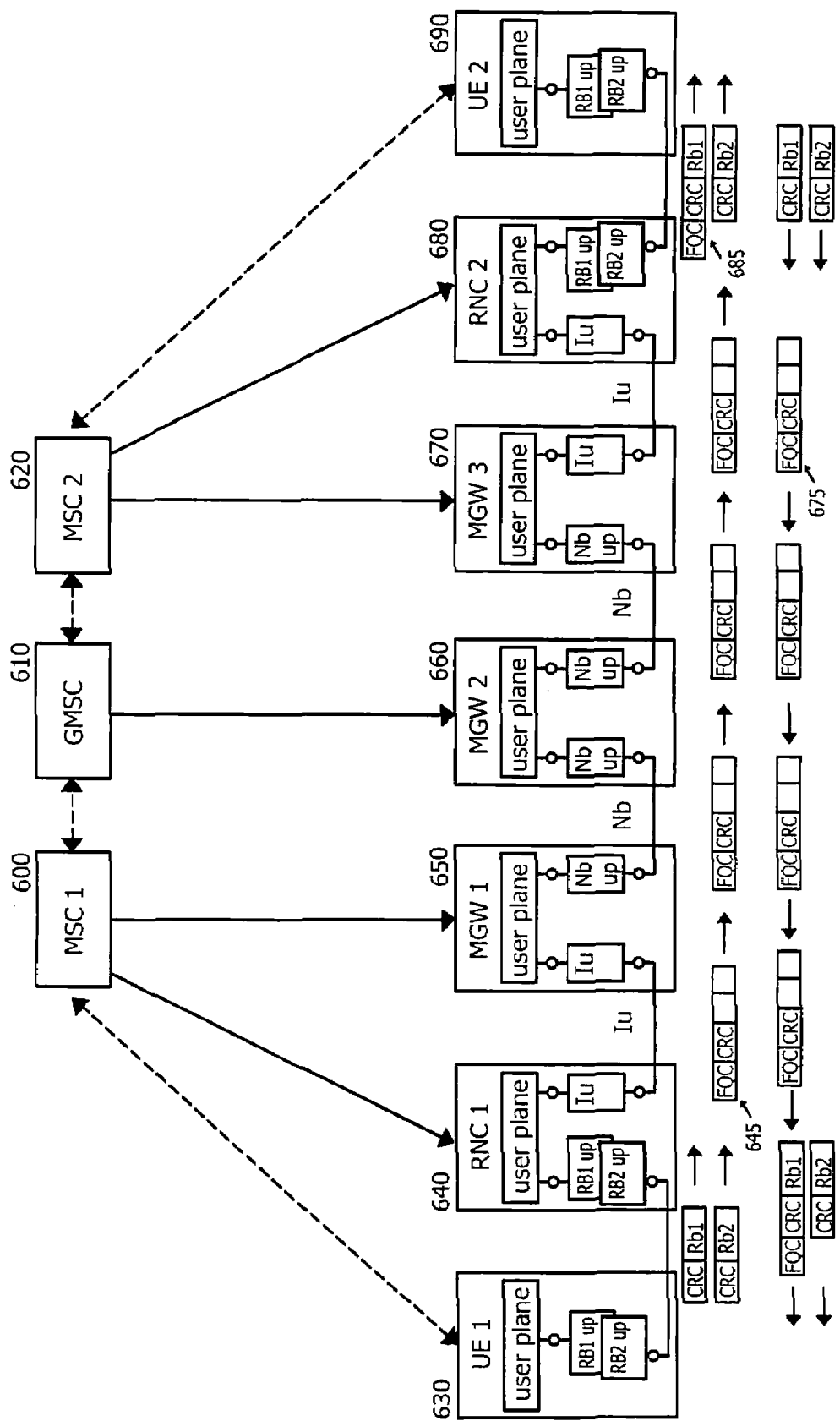
FIG. 6 illustrates a UE to UE speech call using TrFO with one end-to-end FQC according to an embodiment of the present invention.

FIG. 6 illustrates a first UE 630 to second UE 690 speech call using TrFO according to an embodiment of the present invention. While the invention is described below with reference to a speech call, it will be understood that the invention may be applied to any type of application. A server, such as one associated with a first mobile switching center (MSC) 600, instructs a serving RNC 640 to perform a CRC check on frames received in the uplink direction from a first UE 630, which, for example, may be a mobile phone. The MSC 600, according to the results of the CRC check, When frames are sent uplink from the second UE 690 to the second RNC 680, the second MSC 620 instructs the second RNC 680 to check and set the FQC field 675 according to Table 1. These frames are then forwarded, via the Nb interface, through consecutive MGWs 670–650 in the communication path without any further checks being required, since the CRC result and the Iu frame may be transmitted through the CN unchanged. When the frames are sent downlink to the first UE 630, the server associated with the first MSC 600 instructs the serving RNC 640 to perform a CRC check and forward the frames to the UE 630 with a FQC field according to Table 4 via a common protocol, such as radio interface protocols, between the serving RNC 640 and UE 630.

There are circumstances when the FQC field is set (updated) while passing through the MGWs 650–670 in the communication path. For example, the FQC field is set in a particular MGW 650–670 when a transcoder needs to be linked in, e.g., for adaptive multi rate (AMR) speech or in case of TrFO break. In this case, a server(s) in the CN, for example as part of a gateway MSC (GMSC) 610, instructs the MGWs 650–670 to perform the CRC checking and set the FQC field. More particularly, a call control server signals the respective MGW 650–670, using gateway control protocol (GCP), to perform CRC checking and set the FQC fields. Alternatively, the MGW perform this task automatically, whenever a transcoder needs to be linked in. The handling of the FQC field of frames received in the MGW on the incoming side is summarized in Table 5.

TABLE 5

FQC handling in MGW.

| Input | | | |
|---|---|---|---|
| 'Delivery of erroneous SDUs' | FQC in received PDU | Payload CRC | Action |
| 'yes' or 'no' | 'good' | OK | Leave FQC unchanged. Forward SDU and FQC to upper layer |
| 'yes' | 'bad radio' | OK | Leave FQC unchanged. Forward SDU and FQC to upper layer |
| 'yes' | 'good' or 'bad radio' | Not OK | Set FQC to 'bad'. Forward SDU and FQC to upper layer |
| 'yes' | 'bad' | Any | Leave FQC unchanged. Forward SDU and FQC to upper layer |
| 'no' | 'good' | Not OK | Drop SDU |
| 'no' | 'bad' or 'bad radio' | Any | Not applicable. SDUs are dropped at a previous link. |
| 'no-error-detection-consideration' | Any | Any | Leave FQC unchanged. Forward SDU and FQC to upper layer |

A Nb UP protocol entity sets the FQC field in the MGW 650–670 on the outgoing side. The Nb UP protocol layer interacts with the upper layers via the CNL-SAP to provide for a logical exchange of information and control between the upper layer and the Nb UP protocol layer. The upper layer may indicate a FQC field value within an Nb-UP-DATA-Request message, in which case the FQC field is set in the PDU as indicated by the upper layer. If the upper layer does not indicate a FQC field value to the Nb UP protocol layer, the FQC field in the PDU is set to 'good'. If the FQC field value that is indicated by the upper layer to the Nb UP protocol layer is 'bad', the Nb UP support functions may generate an erroneous payload CRC.

Figure 7:
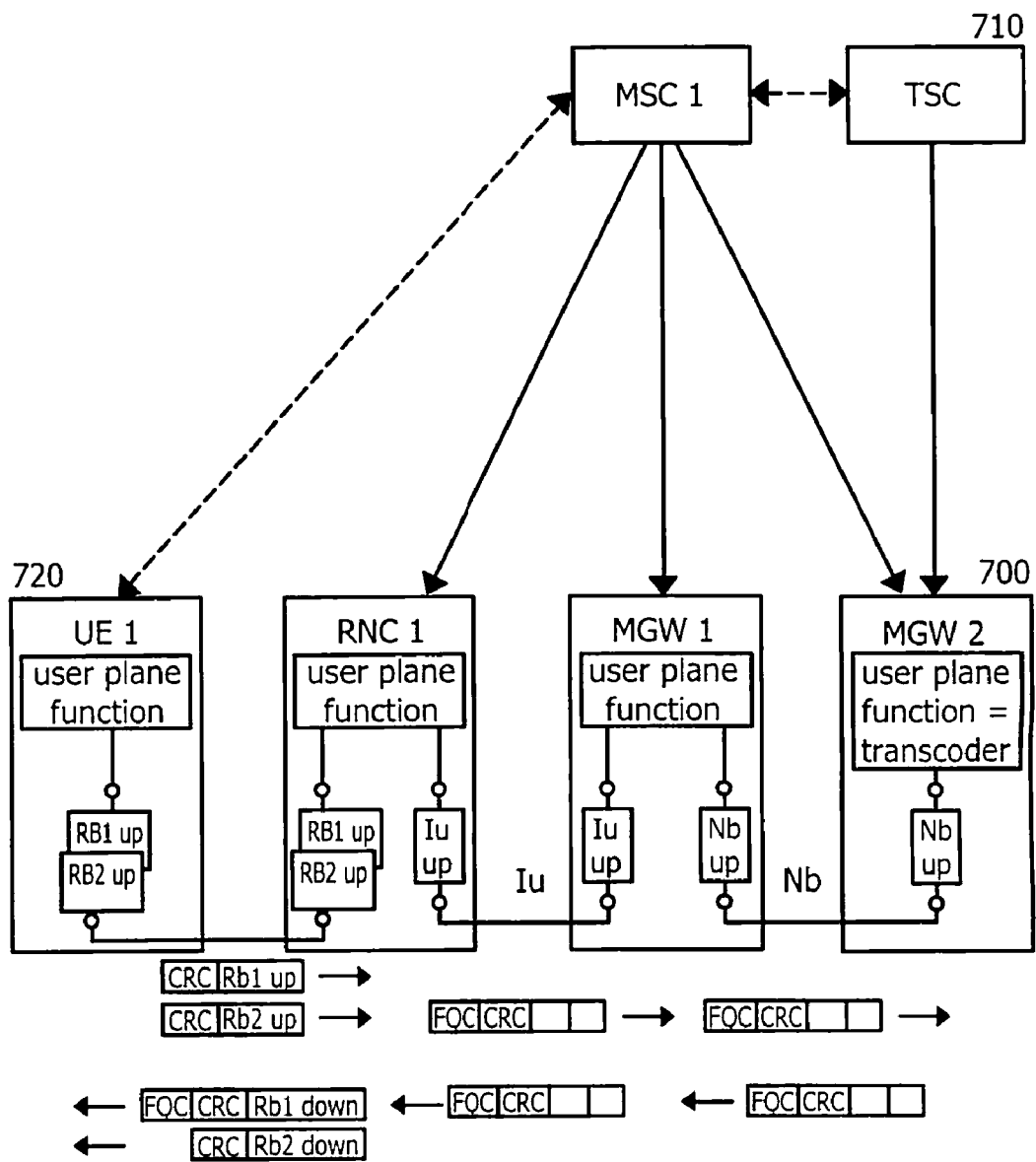
FIG. 7 illustrates the access part of a speech call with a transcoder in the CN according to an embodiment of the present invention.

FIG. 7 illustrates the access part of a speech call with a transcoder in the CN. Here, a speech call is transcoded and forwarded by the CN to another network (not shown), such as a PSTN or ISDN network, via an MGW 700 that is interfaced to the other network. The transcoder is located in the MGW 700 as part of its UP functions under the control of a transit server TS 710. The FQC functions described above are therefore forwarded via the radio, Iu, and Nb interfaces between the UE 720 the MGW 700.

FIG. 8 illustrates a case where multiple individual subflows that correspond to the radio interface protocol frames forwarded to the serving RNC 640, 680 are transmitted through the CN according to another embodiment of the present invention. In such a case, more than one corresponding individual subflow FQC, e.g., FQC1 and FQC2, is transmitted through the CN within the same user plane instance for the given radio interface protocol frame.

It will be appreciated that the steps of the methods illustrated above may be readily implemented either by software that is executed by a suitable processor or by hardware, such as an application-specific integrated circuit (ASIC).

Although described with reference to a communication system, it will be appreciated by those of ordinary skill in the art that this invention can be embodied in other specific forms without departing from its essential character. For example, the invention may be used in any multi-processor system. The embodiments described above should therefore be considered in all respects to be illustrative and not restrictive.

The various aspects of the invention have been described in connection with a number of exemplary embodiments. To facilitate an understanding of the invention, many aspects of the invention were described in terms of sequences of actions that may be performed by elements of a computer system. For example, it will be recognized that in each of the embodiments, the various actions could be performed by specialized circuits (e.g., discrete logic gates interconnected to perform a specialized function), by program instructions being executed by one or more processors, or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

Various embodiments of Applicants' invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A method of maintaining frame quality of data being transported in a telecommunications system from a first user equipment (UE) through a core network (CN) to a second UE, the method comprising the steps of:
  (a) performing, at a first radio network controller (RNC), a cyclic redundancy check (CRC) on at least one radio bearer frame being received from the first UE;
  (b) setting, at the first RNC, a frame quality classifier (FQC) field according to the results of the CRC;

(c) forwarding a corresponding frame with the set FQC field to a first media gateway (MGW) in the CN via an Iu UP interface;
(d) forwarding the corresponding frame with the set FQC field to at least one other MGW in the CN via a Nb UP interface; and
(e) forwarding the corresponding frame with the set FQC field to a second RNC associated with the second UE via a second Iu UP interface.

2. The method of claim 1, wherein in step (d), at least one of the at least one other MGW performs a new CRC on the received corresponding frames and updates the FQC field or passes the FQC field unchanged according the results of the new CRC, a 'Delivery of erroneous SDUs' attribute received from an associated call control server in the CN, and the FQC field in the received corresponding frames.

3. The method of claim 2, wherein in step (d), the at least one of the at least one other MGW performs the new CRC on the received corresponding frames and updates the FQC field to a 'bad' indication when the results of the new CRC indicate 'not OK' and the 'Delivery of erroneous SDUs' attribute indicates "Yes".

4. The method of claim 2, wherein in step (d), the at least one of the at least one other MGW performs the new CRC on the received corresponding frames and updates the FQC field or passes the FQC field unchanged according to the results of the new CRC, the 'Delivery of erroneous SDUs' attribute, and the FQC field in the received corresponding frames, according to indications in the table below:

5. The method of claim 1, further comprising the steps of:
(f) performing, at the second RNC, a new CRC on the corresponding frames as received from the at least one other MGW;
(g) setting, at the second RNC, a FQC field in corresponding radio interface protocol frames with an updated value according to the results of the new CRC and the FQC field value in the frames received from the at least one other MGW; and
(h) forwarding the corresponding radio interface protocol frames with the updated FQC field from the second RNC to the second UE.

6. The method of claim 5, wherein in step (g), the second RNC updates the FQC field or passes the FQC field unchanged according to the results of the new CRC, another 'Delivery of erroneous SDUs' attribute received from the same or another call control server, and the FQC field in the received corresponding frames.

7. The method of claim 6, wherein in step (g), the second RNC updates the FQC field to a 'bad' indication when the results of the new CRC indicates 'not OK' and the other 'Delivery of erroneous SDUs' attribute indicates "Yes".

8. The method of claim 6, wherein in step (g), the second RNC updates the FQC field or passes the FQC field unchanged according to the results of the new CRC, the other 'Delivery of erroneous SDUs' attribute, and the FQC field in the received corresponding frames, according to indications in the table below:

| | Input | | |
|---|---|---|---|
| 'Delivery of erroneous SDUs' | FQC in received PDU | Payload CRC | Action |
| 'yes' or 'no' | 'good' | OK | Leave FQC unchanged. Forward SDU and FQC to upper layer |
| 'yes' | 'bad radio' | OK | Leave FQC unchanged. Forward SDU and FQC to upper layer |
| 'yes' | 'good' or 'bad radio' | Not OK | Set FQC to 'bad'. Forward SDU and FQC to upper layer |
| 'yes' | 'bad' | Any | Leave FQC unchanged. Forward SDU and FQC to upper layer |
| 'no' | 'good' | Not OK | Drop SDU |
| 'no' | 'bad' or 'bad radio' | Any | Not applicable. SDUs are dropped at a previous link. |
| 'no-error-detection-consideration' | Any | Any | Leave FQC unchanged. Forward SDU and FQC to upper layer. |

| | Input | | |
|---|---|---|---|
| 'Delivery of erroneous SDUs' (for a subflow) | FQC | CRC check (If payload CRC present) (on Iu UP frame) | Action (on Iu UP frame) |
| 'yes' or 'no' | 'good' | OK | Pass the frame to radio interface protocols. Forward FQC unchanged. |
| 'yes' | 'bad radio' | OK | Leave FQC unchanged. Forward SDU and FQC to upper layer. |
| 'yes' | 'good' or 'bad radio' | Not OK | Set FQC to 'bad'. Pass the frame to radio interface protocols. |
| 'yes' | 'bad' | Any | Pass the frame to radio interface protocols. Forward FQC unchanged. |
| 'no' | 'good' | Not OK | Drop frame |

-continued

| 'Delivery of erroneous SDUs' (for a subflow) | FQC | CRC check (If payload CRC present) (on Iu UP frame) | Action (on Iu UP frame) |
|---|---|---|---|
| 'no' | 'bad' or 'bad radio' | Any | Not applicable. SDUs are dropped at a previous link. |

9. The method of claim 5, wherein in step (h), the radio interface protocol frames are forwarded to the second UE using radio resource control (RRC) protocols.

10. A method of providing frame quality information to a UE for data received by a RNC from a CN and transmitted to the UE via a radio interface, the method comprising the steps of:
 (a) performing, at the RNC, a CRC on the data as received from a MGW of the CN;
 (b) setting, at the RNC, a FQC field in corresponding radio interface protocol frames according to the results of the CRC and a FQC field value in the frames received from the MGW, wherein the RNC sets the FQC field according to the results of the CRC, a 'Delivery of erroneous SDUs' attribute received from an associated call control server of the CN, and the FQC field in the received data; and
 (c) forwarding the corresponding radio interface protocol frames with the set FQC field from the RNC to the UE via the radio interface.

11. The method of claim 10, wherein in step (b), the RNC sets the FQC field to a 'bad' indication when the results of the new CRC indicates 'not OK' and the 'Delivery of erroneous SDUs' attribute indicates "Yes".

12. The method of claim 10, wherein in step (b), the RNC sets the FQC field according to the results of the CRC, the 'Delivery of erroneous SDUs' attribute, and the FQC field in the received data, according to indications in the table below:

(a) performing, at a first RNC, a CRC on a radio bearer frame being received from the first UE;
 (b) setting, at the first RNC, a plurality of FQC fields according to the results of the CRC;
 (c) forwarding a plurality of subflows each with a corresponding one of the set FQC fields to a first MGW in the CN via an Iu UP interface, the plurality of subflows corresponding to the radio bearer;
 (d) forwarding the corresponding subflows to at least one other MGW in the CN via a Nb UP interface; and
 (e) forwarding the corresponding subflows to a second RNC associated with the second UE via a second Iu UP interface.

15. The method of claim 14, wherein in step (d), at least one of the at least one other MGW performs a new CRC on the received corresponding subflows and updates the FQC field, passes the FQC field unchanged, or drops the frame according the results of the new CRC, a 'Delivery of erroneous SDUs' attribute received from an associated call control server of the CN, and the FQC field in the received corresponding subflows.

16. The method of claim 15, wherein in step (d), the at least one other MGW performs the new CRC on the received corresponding subflows and updates the FQC field to a 'bad' indication when the results of the new CRC indicate 'not OK' and the 'Delivery of erroneous SDUs' attribute is "Yes".

| 'Delivery of erroneous SDUs' (for a subflow) | FQC | CRC check (If payload CRC present) (on Iu UP frame) | Action (on Iu UP frame) |
|---|---|---|---|
| 'yes' or 'no' | 'good' | OK | Pass the frame to radio interface protocols. Forward FQC unchanged. |
| 'yes' | 'bad radio' | OK | Leave FQC unchanged. Forward SDU and FQC to upper layer. |
| 'yes' | 'good' or 'bad radio' | Not OK | Set FQC to 'bad'. Pass the frame to radio interface protocols. |
| 'yes' | 'bad' | Any | Pass the frame to radio interface protocols. Forward FQC unchanged. |
| 'no' | 'good' | Not OK | Drop frame |
| 'no' | 'bad' or 'bad radio' | Any | Not applicable. SDUs are dropped at a previous link. |

13. The method of claim 10, wherein in step (c), the radio interface protocol frames are forwarded to the UE using RRC protocols.

14. A method of maintaining frame quality of data being transported in a telecommunications system from a first UE through a CN to a second UE, the method comprising the steps of:

17. A system for maintaining frame quality of data being transported in a telecommunications system from a first UE through a CN to a second UE, the system comprising:
 a first RNC that performs a CRC on one or more radio bearers frame being received from the first UE, sets a FQC field according to the results of at least one of the CRCs, and forwards corresponding data frames with the set FQC field to a first MGW in the CN via an Iu UP interface; and a second MGW in the CN that receives the corresponding data from the first MGW via an Nb UP interface, performs a new CRC on the received corresponding data and updates the FQC field, passes the FQC field unchanged, or drops the frame according the results of the new CRC, a 'Delivery of erroneous SDUs' attribute received from an associated call control server in the CN, and the FQC field in the received corresponding data.

18. A RNC for providing frame quality information to a UE for a frame of data received by the RNC from a CN and forwarded to the UE via a radio interface, comprising:

means for performing a CRC on the frame as received from the CN, means for setting a FQC field in a corresponding radio interface protocol frame with an updated value according to the results of the CRC and a FQC field value in the frame received from the MGW, wherein the RNC includes means for updating the FQC field, passing the FQC field unchanged, or dropping the frame according to the results of the CRC, a 'Delivery of erroneous SDUs' attribute received from a call control server, and the FQC field in the received frames, and means for forwarding the corresponding radio interface protocol frame with the updated FQC field from the RNC to the UE via the radio interface.

19. The RNC of claim 18, wherein the RNC further comprises means for updating the FQC field to a 'bad' indication when the results of the new CRC indicate 'not OK' and the 'Delivery of erroneous SDUs' attribute indicates "Yes".

* * * * *